US009969653B2

(12) United States Patent
Scott et al.

(10) Patent No.: US 9,969,653 B2
(45) Date of Patent: May 15, 2018

(54) TITANIUM-DIAMOND WELD HARDFACING COMPOSITION, METHOD AND APPARATUS

(71) Applicant: J&S Worldwide Fabricators Ltd., Calgary (CA)

(72) Inventors: James B. Scott, Kingwood, TX (US); Sherilyn K. Godkin, Humble, TX (US)

(73) Assignee: J & S WORLDWIDE FABRICATORS, LTD., Calgary (CA)

( * ) Notice: Subject to any disclaimer, the term of this patent is extended or adjusted under 35 U.S.C. 154(b) by 506 days.

(21) Appl. No.: 14/522,574

(22) Filed: Oct. 23, 2014

(65) Prior Publication Data

US 2016/0114419 A1  Apr. 28, 2016

(51) Int. Cl.
| | | |
|---|---|---|
| *C04B 35/56* | (2006.01) | |
| *B23K 9/04* | (2006.01) | |
| *B23K 35/365* | (2006.01) | |
| *C04B 35/628* | (2006.01) | |

(52) U.S. Cl.
CPC ............ *C04B 35/5626* (2013.01); *B23K 9/04* (2013.01); *B23K 35/365* (2013.01); *C04B 35/62842* (2013.01); *C04B 2235/427* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,049,435 A | * | 8/1962 | Shwayder ................. | B22F 9/26 427/191 |
| 3,929,432 A | * | 12/1975 | Caveney ................. | B24D 18/00 51/295 |
| 4,142,869 A | * | 3/1979 | Vereschagin ............ | B01J 3/062 51/295 |
| 4,472,619 A | * | 9/1984 | Ueda ....................... | B23K 9/04 219/76.15 |
| 5,024,680 A | * | 6/1991 | Chen ..................... | C09K 3/1445 51/293 |
| 5,944,127 A | * | 8/1999 | Liang .................... | B22F 1/0014 175/374 |
| 6,303,891 B1 | * | 10/2001 | Gault .................... | B23K 35/383 219/137 R |
| 2012/0325779 A1 | * | 12/2012 | Yelistratov ............... | B23K 9/04 219/76.14 |

* cited by examiner

*Primary Examiner* — Anne M Antonucci
*Assistant Examiner* — Renee LaRose
(74) *Attorney, Agent, or Firm* — Maschoff Brennan

(57) ABSTRACT

A hard-clad coating composition for hardfacing is described. Also described is a weld hardfacing method for applying a coating composition to a base metal, and an apparatus for introducing the coating composition to the weld process.

15 Claims, 4 Drawing Sheets

TITANIUM-DIAMOND WELD HARDFACING COMPOSITION, METHOD AND APPARATUS

FIELD OF INVENTION

The present invention relates generally to the field of hard-clad compositions for hardfacing applications, methods for weld hardfacing, and an apparatus for introducing hard-clad compositions to a weld process.

BACKGROUND OF THE INVENTION

The oil and gas industry uses metal products in virtually every aspect of business operations, including exploration, production, refining and pipeline transportation.

For example, a refinery is an industrial process plant where crude oil is processed and refined into more useful products, such as petroleum naphtha, gasoline and diesel fuel, base stock for asphalt, heating oil, kerosene and liquified petroleum gas. Oil refineries are large, sprawling complexes with extensive piping running throughout carrying streams of fluids between large chemical processing units.

The basic function of a refinery is to refine base stocks into finished products. This requires a separating process whereby crude oil is separated by fractional distillation (heating base stock in a fractionating tower). The fractions at the top of the tower have lower boiling points than fractions at the bottom. For example, the boiling point for gas is 20 degrees, gasoline is 150 degrees, kerosene is 200 degrees, diesel oil is 300 degrees, fuel oil is 370 degrees and "heavy ends" is 400 degrees or higher. The separated molecules are then moved to specialized processing units pipe and converted into finished products. The central mode of product transportation for all of this work is pipe.

Oil and gas refineries are typically a low margin, high capital investment business. As such, they must run continuously and efficiently to produce a net profit that justifies the investment.

It is therefore a significant problem for any refinery to not be running for a period of time. It is desirable to minimize any "down time" for part replacement and repairs. Since piping is the primary mode of product transport, an improvement in the lifespan of piping presents a substantial savings in cost, and increase in profitability, to the industry.

An increase in the lifespan of piping also lessens risk associated with product leakage. Product leakage can result in fire and fume injuries, as well as environment damage. The lifespan of piping is a paramount issue in the oil and gas industry.

Hardfacing is a process by which a harder material can be applied to a base substrate metal, typically by welding. Hardfacing can be used to improve the wear resistance of metal parts, since the harder material protects the surface of the metal parts to which it has been applied. New metal parts can be protected by hardfacing, and, similarly, worn metal parts can be restored using this process. The use of hardfacing could assist in the piping lifespan issues described above.

Wear resistance is an issue that has received attention within the oil and gas industry since it significantly affects costs in the aforementioned four major business operations.

Some research has led to inventions which are the subject of patents. For example, U.S. Pat. No. 3,936,295 to Cromwell et al. discloses the coating of surface properties of bearings and rotors through a plasma-spraying process that includes nickel-aluminium, nickel-molybdenum, tungsten carbide and an intermetallic alloy.

In the present invention, new metallurgical properties are applied to metal. An aspect of these new properties is the production of a hard-clad matrix that is substantially harder than unaffected parent material, and which is wear resistant, repairable, casing friendly, smooth, non-magnetic and cost efficient.

These and other objects and advantages of the present invention will be apparent from the following detailed description of the invention and the preferred embodiments thereof.

SUMMARY OF THE INVENTION

One aspect of the disclosure provides a hard-clad coating composition for applying to a base metal substrate by weld hardfacing comprising two constituent materials, in which the first constituent material is tungsten carbide and the second constituent material is a titanium-diamond compound.

A further aspect of the disclosure provides that the amount of the titanium-diamond compound present in the coating composition is in the range of 5-25% of the total weight of the composition.

A further aspect of the disclosure provides that the amount of tungsten carbide present in the coating composition is in the range of 75-95% of the total weight of the composition.

A further aspect of the disclosure provides that the titanium-diamond compound is a synthetic diamond with a titanium coating.

A further aspect of the disclosure provides that the tungsten carbide is in particle form with a size between 30 and 40 microns.

A further aspect of the disclosure provides that the titanium-diamond compound is in particle form with a size between 60 and 80 microns.

A still further aspect of the disclosure provides a method of applying a hard-clad coating composition to a base metal substrate using gas metal arc welding comprising:

preparing a hard-clad coating composition for applying to a base metal substrate by weld hardfacing comprising two constituent materials, in which the first constituent material is tungsten carbide and the second constituent material is a titanium-diamond compound; and combining the hard-clad coating composition with melting welding wire in a molten weld puddle on the base metal substrate.

A further aspect of the disclosure provides that the shielding gas used in the above-referenced method is 98% argon and 2% oxygen.

A further aspect of the disclosure provides that the hard-clad coating composition in the above-referenced method is delivered to the molten weld puddle at a rate of 140-160 grams per minute.

A further aspect of the disclosure provides that, when the mixed constituent materials arrive at the base metal in the above-referenced method, they are mixed with a molten weld puddle that has been created by melting welding wire, which is 0.045 inches in size before melting.

A further aspect of the disclosure provides that the amount of the titanium-diamond compound present in the coating composition in the above-referenced method is in the range of 5-25% of the total weight of the composition.

A further aspect of the disclosure provides that the amount of tungsten carbide present in the coating composition in the above-referenced method is in the range of 75-95% of the total weight of the composition.

A further aspect of the disclosure provides that the titanium-diamond compound in the above-referenced method is a synthetic diamond with a titanium coating.

A further aspect of the disclosure provides that the tungsten carbide in the above-referenced method is in particle form with a size between 30 and 40 microns.

A further aspect of the disclosure provides that the titanium-diamond compound in the above-referenced method is in particle form with a size between 60 and 80 microns.

A still further aspect of the disclosure provides a mixing and feeding apparatus for mixing a hard-clad coating composition and introducing it into a gas metal arc welding process comprising a first container for holding and dispensing a first constituent material, a second container for holding and dispensing a second constituent material, a mixer for introducing the first constituent material into a mixing container at a determined rate, a mixer for introducing the second constituent material into the mixing container at a determined rate to form the hard-clad coating composition, and a feeder for supplying the hard-clad coating composition to the gas metal arc welding process.

A further aspect of the disclosure provides that at least one of the mixers in the above-referenced apparatus is a cylindrical wheel rotatably fitted within a wheel chamber, which wheel has holes bored therein which are sized and located on the wheel such that when the wheel rotates within the wheel chamber, the holes fill with constituent material at one side of the wheel chamber as the holes rotate through the constituent material, and are then emptied at the other side of the wheel chamber as the wheel continues to rotate.

A further aspect of the disclosure provides that at least one of the cylindrical wheels in the above-referenced apparatus is attached to a variable speed motor such that the speed at which the cylindrical wheel rotates can be varied and the rate at which constituent material is supplied to the mixing container can thus be controlled.

A further aspect of the disclosure provides that the feeder in the above-referenced apparatus is a feeder tube is attached to a MIG gun used in the gas metal arc welding process, and the hard-clad coating composition advances through the feeder due to gravity and vibration caused by oscillations of the MIG gun.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings.

DETAILED DESCRIPTION OF AN EMBODIMENT

Figure 1:
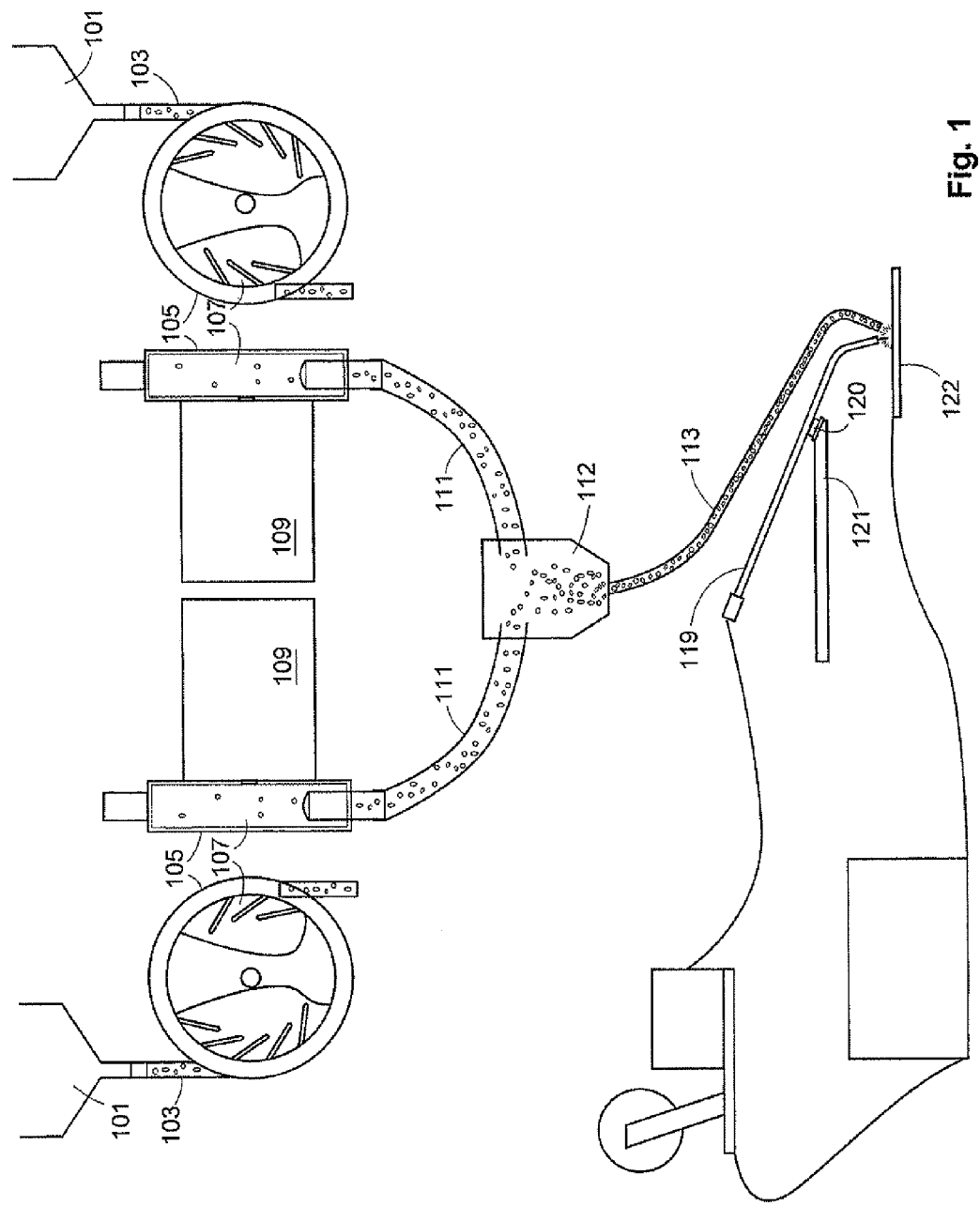
FIG. 1 is a schematic view of a mixer and feeder apparatus also showing the mixing wheels in two different views.

The description which follows, and the embodiments described therein, are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

One aspect of the invention is a hard-clad coating composition on a base metal substrate. While it will be appreciated by one of skill in the art that various metals may be used as a base substrate, the metal substrate to which the coating is applied in the present invention is a standard steel alloy and higher quality steels with higher strength.

In one embodiment, the base material is a carbon steel ASTM A36/A36M-08/ASTM 516 grade 70/ASTM A 572 grade 50.

The coating composition is comprised of tungsten carbide combined with a combination of titanium and diamond. The material form of the titanium-diamond is pellets with a mesh size of 60-80 microns (60 microns=250 U.S. Standard and 80 microns=177 U.S. Standard). The pellets are diamond encased with titanium. The tungsten carbide is in the material form of round pellets (95.96% tungsten, 3.92% combined carbon, 0.02% free carbon and 0.10% iron) with a mesh size of 30-40 microns.

The coating composition can be prepared by various methods. In one embodiment, a custom motorized apparatus having hopper, meter, mixer and feeder functions can be used to prepare the composition.

In a first step, the titanium-diamond is placed in one hopper of the motorized apparatus, and the tungsten carbide is placed into another hopper.

The constituent materials are then measured by an adjustable meter to achieve proper proportions. The proportions of constituent materials can vary from 5-25% of titanium-diamond to 75-95% of tungsten carbide.

In the last step of preparing the coating composition, these metered constituent materials are mixed together by the mixer function of the motorized apparatus.

Another aspect of the invention is a state-of-the-art welding process for applying the hard-clad coating composition to a base metal substrate.

The welding process uses gas metal arc welding to apply the coating composition of the invention to a base metal substrate. Briefly, the mixed constituent materials, possibly prepared as aforesaid, are combined with a melting welding wire in a molten weld puddle on the base metal. These materials then form a metallurgical bond between the substrate and deposit.

In one embodiment, the mixed constituent materials are delivered to the welding gun/welding area through a feeder tube. The delivery rate is 140-160 grams per minute. When the mixed constituent materials arrive at the base metal, they are mixed with a molten weld puddle that has been created by melting welding wire, which is 0.045 inches in size before melting.

While it can be appreciated that various shielding gases can be used in the gas metal arc welding process, in one embodiment, the shielding gas used is 98% argon and 2% oxygen.

Another aspect of the invention is a mixing and feeding apparatus for introducing the constituent materials of the coating composition into the welding process. Briefly, the feeder apparatus comprises two hoppers for different constituent materials, two mixing wheels for supplying constituent materials into outlet tubes at variable rates, a mixing chamber for mixing the constituent materials, and a feeder tube to supply the mixed constituent materials to a MIG gun for welding to the substrate material.

In drawings which illustrate embodiments of the disclosure, FIG. 1 is a schematic showing the mixing and feeding apparatus. Briefly, the apparatus comprises two hoppers 101. The hoppers are designed to hold constituent materials. At the bottom of each hopper is an inlet tube 103. Each inlet tube feeds into a wheel chamber 105 such that the constituent materials in the hoppers flow down the inlet tubes and into wheel chambers. Within each wheel chamber the constituent materials are dispensed at an even rate by mixing wheel 107, which is attached to variable speed motor 109. The constituent materials from each wheel chamber feed down the outlet tubes to a mixing chamber 112 where they are combined, and then subsequently down a feeder tube 113 to a MIG gun 119 for welding.

Figure 2:
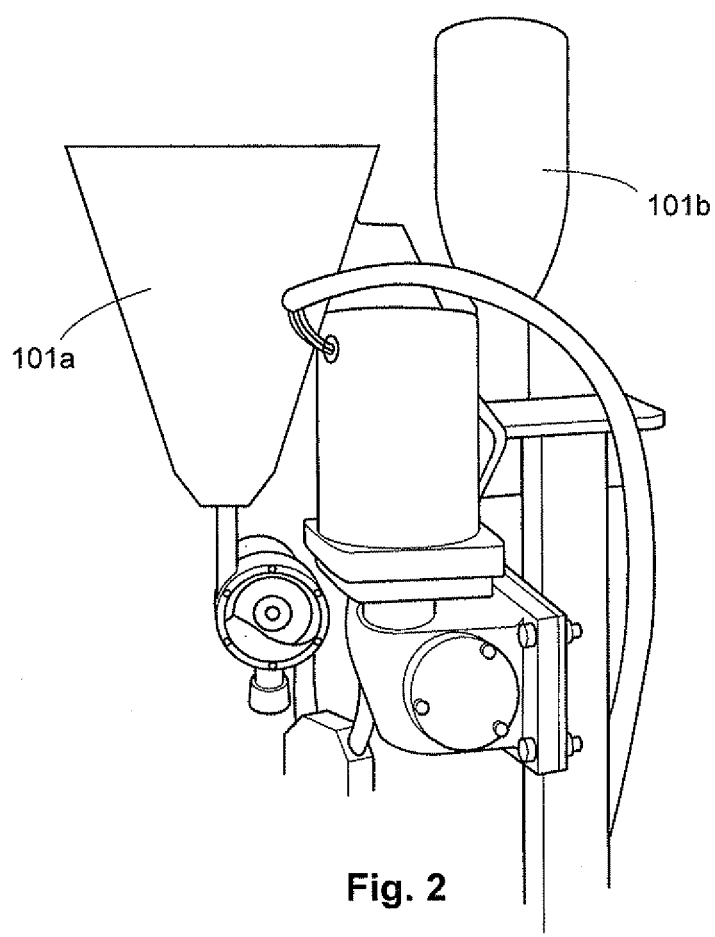
FIG. 2 is a perspective view of two hoppers and a mixing wheel component of the mixer and feeder apparatus.

FIG. 2 shows the apparatus configured such that hopper 101a is a tungsten carbide hopper and hopper 101b is a titanium diamond hopper.

Figure 3:
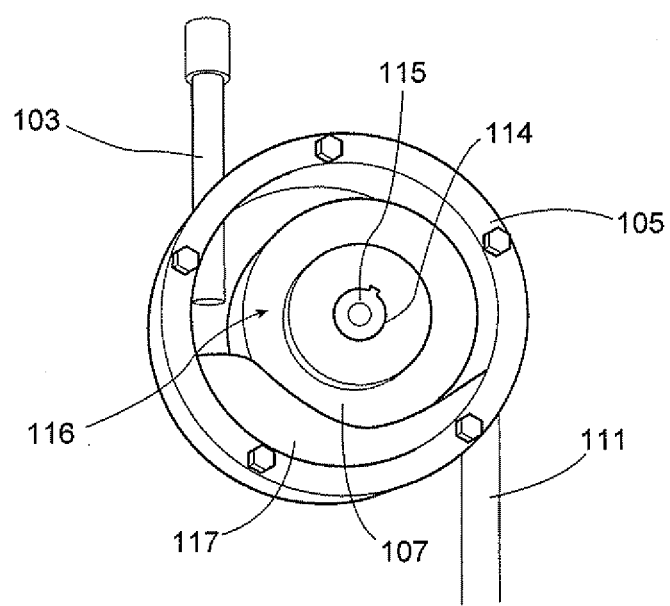
FIG. 3 is a perspective view of a mixer wheel and wheel chamber of the mixer and feeder apparatus.

FIG. 3 shows a front view of one mixing wheel component of the apparatus. It will be appreciated that both mixing wheel components will be similar, and, for brevity, only one of the two components is described in detail herein. Wheel chamber 105 is cylindrical in shape, and generally fully enclosed such that constituent materials can only enter wheel chamber 105 via inlet tube 103, and exit via outlet tube 111. Enclosed within wheel chamber 105 is mixing wheel 107. Wheel chamber 105 can be made out of metal, but it will be appreciated that other materials can be used. Furthermore, the front wall of wheel chamber 105 can comprise removable cover 116. Removable cover 116 can be made of metal or any other material, including a transparent material such as plastic or glass. It will be appreciated that the removable cover may be desirable to allow access to the interior of the wheel chamber, and the mixing wheel, for cleaning and maintenance. It may also be desirable for the cover to be transparent to allow for the amount of constituent material 117 in the chamber to be readily discerned.

Figure 4:
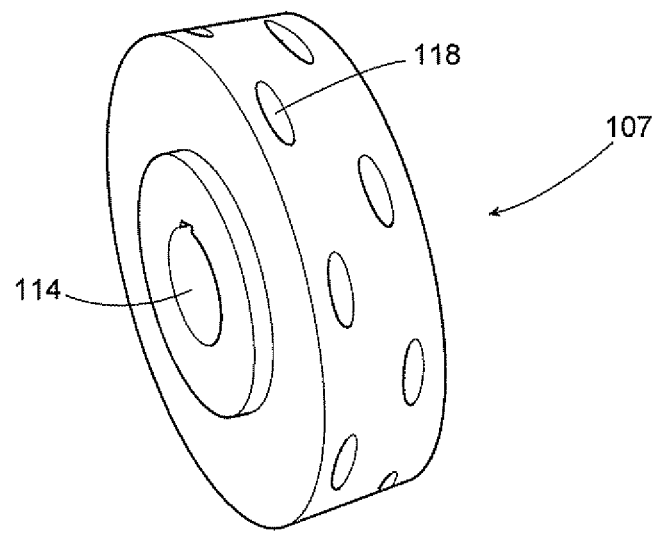
FIG. 4 is a perspective view of a mixer wheel of the mixer and feeder apparatus.

FIG. 4 shows mixing wheel 107 in perspective. Mixing wheel 107 is cylindrical in shape and sized such that it can fit entirely within wheel chamber 105, and can rotate freely around its axis within wheel chamber 105. Mixing wheel 107 is fitted with an axial opening 114 to or through which a shaft 115 can be attached or inserted, as shown in FIG. 3. Shaft 115 is attached to variable speed motor 109 such that it is rotated at a speed determined by the speed at which variable speed motor 109 is running. Shaft 115 is sized such that, when it is attached to or inserted into mixing wheel 107 at axial opening 114, it turns mixing wheel 107 at a speed determined by the speed at which the variable speed motor 109 is running. As each mixing wheel is attached to a different variable speed motor, it will be appreciated that the different mixing wheels can be rotated at different speeds.

Mixing wheel 107 has one or more bore holes 118 dispersed along the circumferential side of the mixing wheel. The bore holes can be generally cylindrical in shape, though it will be appreciated that other shapes can be used for the bore holes. The bore holes are closed at the end proximal to the axis of mixing wheel 107, and are open at the distal end. The bore holes may be 1/16 inch in diameter at the distal opening, and may be 3/4 inch in depth as measured to the closed proximal end, though it will be appreciated that other sizes and depths may also be employed provided that the bore holes are capable of containing constituent material. Each bore hole 118 is angled with respect to the radial direction of the mixing wheel, such that the distal end of each bore hole 118 leads each bore hole's proximal end when the mixing wheel is rotated. By being angled thusly in relation to the radius, with respect to the direction of the rotation, each bore hole 118 acts as a scoop and picks up the constituent material near where it is deposited in the wheel chamber by the inlet tube 103 as the mixing wheel brings the bore hole through the constituent material in that area of the wheel chamber. As the mixing wheel continues to rotate, the bore hole is filled with constituent material, and the constituent material is then deposited near outlet tube 110 as the orientation of the bore hole is inverted due to the continued rotation of the mixing wheel.

The mixing wheel and shaft can be made out of metal, but it will be appreciated that other materials can be used.

Figure 5:
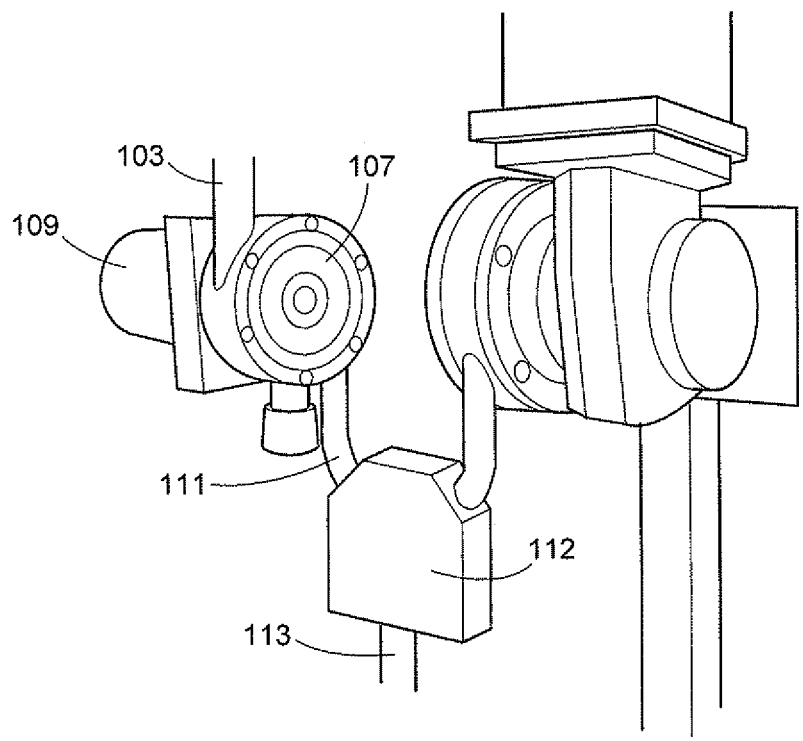
FIG. 5 is a perspective view of two mixer chambers and the mixing chamber of the mixer and feeder apparatus.
Figure 6:
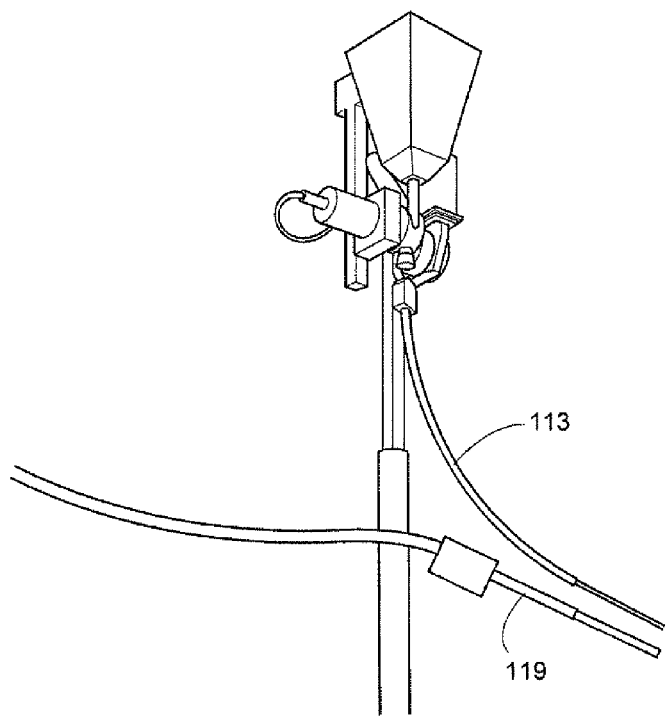
FIG. 6 is a perspective view of the feeder tube and part of the MIG gun of the mixer and feeder apparatus.
Figure 7:
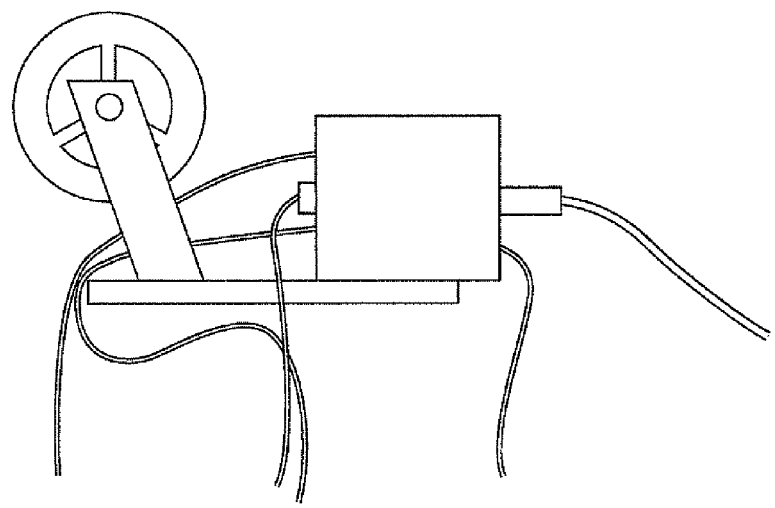
FIG. 7 is front view of the MIG wire feeder of the mixer and feeder apparatus.

FIG. 5 shows a perspective view of the mixing wheel components of the apparatus and the mixing chamber 112. As can be seen, each wheel chamber comprises a mixing wheel which is attached at its axis to a variable speed motor. By varying the speed of each motor, the rate at which the constituent materials in each wheel chamber is fed into the outlet tubes and, ultimately, mixing chamber 112, can be varied.

The mixed constituents in mixing chamber 112 are then fed down feeder tube 113 to a MIG gun for welding. The mixed constituents are fed down feeder tube 113 due to gravity, but such movement may also be assisted by vibrations caused by oscillation from the MIG gun due to its being mounted on an oscillator 120.

The MIG gun 119 is mounted on an oscillator 120, which is attached to a manipulator boom 121. The oscillator and manipulator boom can be used to move the MIG gun over work surface 122 to permit application of the mixed constituent materials to the work surface.

In one embodiment, a DCEP reverse current is used, and an amperage range of 240-260 amps may be used. A voltage range of 28 to 30 volts may be used. A weave bead welding technique can be used. The nozzle/gas cup size used can be 3/8" to 5/8". The technique can include 1" of oscillation and the MIG gun can travel at a speed of 7"-9" per minute.

Example 1

A hard-clad overlay was prepared and applied in accordance with the methods and using the apparatus described herein. Specifically, the overlay was applied to a subject piece of ½ inch thick plate of ASTM A36/A A36M-08/ASTM A 516Gr70 ASTM A 572 Gr having dimensions of 5¼ inches by 6⅛ inches. It was applied using a gas metal arc welding process as described more fully herein, and in accordance with the latest edition of the ASME Code, Section IX.

The weld type was hardface overlays. No more than two cracks in a 2" circle with total combined length less than or equal to 4" was permitted. The maximum permissible crack was not to exceed 1/32" and could not extend into the base metal.

The base metals had a P-Number of 1 and a thickness range of 0.5" to 1.0".

The minimum preheat temperature was 300° F., and the maximum interpass temperature was 600° F. There was no preheat maintenance. No postweld heat treatment was performed.

The initial and interpass cleaning consisted of brushing the clean area to be overlayed with a stainless steel brush. For back gouging, overlay defects were removed by grinding only.

For filler metal, there was a 1.25" minimum weld deposit limit. The AWS Classification number of the filler metal was ER80S-D2, the SFA specification was 5.28, and the F-Number was 6. The A-Number was 11. The filler metal product form was bare (solid), and the supplemental filler metal was Ti-Diamond/Tungsten Carbide.

The position of the joint was flat only.

The shielding gas used was 98% argon, 2% oxygen, at a rate of 32-42 cubic feet per hour. No trailing gas was used.

The current type and polarity was DCEP (reverse), the transfer mode was globular arc, and the maximum heat input, first layer, was 68357 J/in.

In terms of technique, the weave bead technique was used. The nozzle/gas cup size was ⅜" to ⅝". There was 1" of oscillation. There was no peening. The contact tube to work distance was ¾", and there was one electrode. A single layer was applied.

The welding parameters involved a single layer, a filler metal with AWS Classification of ER80S-D2 and size of 0.45", a DCEP (reverse) current with an amperage range of 240-260 volts, a voltage range of 28-30 volts, and a travel speed range of 7"-9" per minute.

Visual observation revealed that the weld coupon had very good as welded appearance with beads of consistent size. There was no discoloration noted or evidence of extreme overheating. There was no evidence of large or deep cracks along the fusion line of the weld nor was there evidence of cracking between the beads along the length of the weld. The thin parent metal plate revealed some evidence of bow typical of overlays on thin plate. Liquid penetration of the as welded hard-clad revealed no apparent cracks on the surface. Scanning electron microscopy revealed the presence of titanium in the weld deposit, as well as evidence of carbide pellets.

Independent testing of the hard-clad weld overlay revealed that the top of the overlay exhibited a considerably higher hardness than the parent material and exhibited little or no carbide pellets intact. In other words, the carbide pellets had been dissolved and put into solution along with the titanium coated diamond resulting in a weld metal with fine carbides distributed in the material along the grain boundaries with a fine structure. The bottom portion of the overlay exhibited the presence of carbide pellets with the density of pellets concentration increasing moving deeper from the top surface of overlay, meaning the concentration increased closer to the fusion line between the carbon steel parent material and weld overlay. Hardness was confirmed by both Rockwell Hardness Test (HRA & HRBW) and the Vickers Hardness Test.

The test results are set out below in Tables 1 and 2.

TABLE 1

Rockwell Hardness Test (HRA & HRBW)

| Weld-Top Pass (HRA) | | Weld-Carbide Pellets (HRA) | | Parent Material-Heat Affected Zone (HRBW) | | Parent Material-Base (HRBW) | |
|---|---|---|---|---|---|---|---|
| Loc. | Reading | Loc. | Reading | Loc. | Reading | Loc. | Reading |
| 1 | 73.0 | 6 | 78.5 | 11 | 91.0 | 16 | 83.0 |
| 2 | 72.5 | 7 | 75.0 | 12 | 86.5 | 17 | 84.5 |
| 3 | 70.0 | 8 | 84.0 | 13 | 82.5 | 18 | 82.5 |
| 4 | 79.0 | 9 | 82.0 | 14 | 82.0 | 19 | 78.0 |
| 5 | 75.5 | 10 | 79.5 | 15 | 84.5 | 20 | 81.0 |
| Avg.: | 74.0 | Avg.: | 79.8 | Avg.: | 85.3 | Avg.: | 81.8 |

Note:
readings are actual and not converted.

Standard Physical Metallurgy Tests

TABLE 2

Vickers Hardness Test HV1 (1 kg load)

| | Top Pass | | Pellets | | Matrix | | Heat Affected Zone | | Base | |
|---|---|---|---|---|---|---|---|---|---|---|
| Loc. | HV1 | HRA | HV1 | HRA | HV1 | HRA | HV1 | HRB | HV1 | HRB |
| 1 | 425.1 | 72.1 | 2169.7 | — | 484.8 | 74.7 | 171.1 | 86.7 | 163.3 | 84.4 |
| 2 | 421.4 | 71.9 | 1194.9* | 87.6 | 477.4 | 74.4 | 170.4 | 86.5 | 169.2 | 86.1 |
| 3 | 436.9 | 72.6 | 2468.2 | — | 582.3 | 78.1 | 168.2 | 85.8 | 161.2 | 83.7 |
| 4 | 448.3 | 73.2 | 2040.0 | — | 510.7 | 75.8 | 170.2 | 86.4 | 161.0 | 83.7 |
| 5 | 454.7 | 73.5 | 2313.8 | — | 533.2 | 76.5 | 170.6 | 86.5 | 158.7 | 82.9 |
| Avg.: | 437.28 | 72.7 | 2247.9 | — | 517.6 | 75.9 | 170.1 | 86.4 | 162.7 | 84.2 |

Note:
Rockwell figures are converted, not actual.
*Reading excluded from average.

The top pass of the weld and carbide pellets were tested using HRA indentor, and the heat affected zone and base were testing using HRBW indentor.

The highest reading on the top pass (Rockwell A) was 79 and the lowest was 70 with an average of 74.

The highest reading on the bottom layer (matrix) (Rockwell A) was 84 and the lowest was 75 with an average of 79.8.

The carbide pellets in the bottom layer average a hardness of 2247.9 Vickers.

The highest reading in the heat affected zone of the carbon steel parent material (Rockwell B) was 86.7 and the lowest was 85.8 with an average hardness of 86.4 (51.7 to 52.4 A scale converted).

The highest reading in the parent material (unaffected heat) (Rockwell B) was 86.1 and the lowest was 82.9 with an average of 84.2 (49 A scale converted).

Examination of the titanium-coated diamond by SEM (scanning electron microscopy utilizing Energy Dispersive Spectroscopy by x-ray) revealed that the titanium was put into solution in the matrix and confirmed by EDS spectra.

The hardness increased from the unaffected parent material of 49 HRA converted, to a hard-clad matrix hardness of 79.8 HRA; an increase of better than 63%. However, if the carbide is included in the calculation, the hardness is several times greater than the unaffected parent material. The carbide pellets averaged 2247 Vickers and if converted (non-standard), the unaffected parent material is 150 Vickers approximately. That means the pellets are 14.98 times harder than the unaffected parent material. As a result, the converted hard-clad matrix of titanium-diamond and tungsten carbide is several times harder than the unaffected parent material.

Although the invention has been described with reference to certain specific embodiments, various modifications thereof will be apparent to those skilled in the art without departing from the spirit and scope of the invention.

The invention claimed is:

1. A hard-clad coating composition for applying to a base metal substrate by weld hardfacing comprising two constituent materials, in which the first constituent material is tungsten carbide and the second constituent material is a titanium-diamond compound.

2. The coating composition of claim 1, wherein the amount of the titanium-diamond compound present in the coating composition is in the range of 5-25% of the total weight of the composition.

3. The coating composition of claim 1, wherein the amount of tungsten carbide present in the coating composition is in the range of 75-95% of the total weight of the composition.

4. The coating composition of claim 1, wherein the titanium-diamond compound is a synthetic diamond with a titanium coating.

5. The coating composition of claim 1, where the tungsten carbide is in particle form with a size between 30 and 40 microns.

6. The coating composition of claim 1, wherein the titanium-diamond compound is in particle form with a size between 60 and 80 microns.

7. A method of applying a hard-clad coating composition to a base metal substrate using gas metal arc welding comprising:
   a. preparing a hard-clad coating composition for applying to a base metal substrate by weld hardfacing comprising two constituent materials, in which the first constituent material is tungsten carbide and the second constituent material is a titanium-diamond compound; and
   b. combining the hard-clad coating composition with melting welding wire in a molten weld puddle on the base metal substrate.

8. The method of claim 7, wherein the shielding gas used is 98% argon and 2% oxygen.

9. The method of claim 7, wherein the hard-clad coating composition is delivered to the molten weld puddle at a rate of 140-160 grams per minute.

10. The method of claim 7, wherein, when the mixed constituent materials arrive at the base metal, they are mixed with a molten weld puddle that has been created by melting welding wire, which is 0.045 inches in size before melting.

11. The method of claim 7, wherein the amount of the titanium-diamond compound present in the coating composition is in the range of 5-25% of the total weight of the composition.

12. The method of claim 7, wherein the amount of tungsten carbide present in the coating composition is in the range of 75-95% of the total weight of the composition.

13. The method of claim 7, wherein the titanium-diamond compound is a synthetic diamond with a titanium coating.

14. The method of claim 7, where the tungsten carbide is in particle form with a size between 30 and 40 microns.

15. The method of claim 7, wherein the titanium-diamond compound is in particle form with a size between 60 and 80 microns.

* * * * *